United States Patent
Takahashi

(10) Patent No.: US 9,758,148 B2
(45) Date of Patent: Sep. 12, 2017

(54) MOTOR VEHICLE HAVING CREEP TORQUE CONTROL

(71) Applicant: Toyota Jidosha Kabushiki Kaisha, Toyota-shi, Aichi-ken (JP)

(72) Inventor: Yoshimitsu Takahashi, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 294 days.

(21) Appl. No.: 14/662,943

(22) Filed: Mar. 19, 2015

(65) Prior Publication Data

US 2015/0266478 A1    Sep. 24, 2015

(30) Foreign Application Priority Data

Mar. 24, 2014   (JP) .................................. 2014-59977

(51) Int. Cl.
| | |
|---|---|
| *B60W 10/08* | (2006.01) |
| *B60W 30/18* | (2012.01) |
| *B60W 10/18* | (2012.01) |
| *B60W 30/16* | (2012.01) |

(52) U.S. Cl.
CPC ............ *B60W 10/08* (2013.01); *B60W 10/18* (2013.01); *B60W 30/16* (2013.01); *B60W 30/18063* (2013.01); *B60W 2550/308* (2013.01); *B60W 2710/083* (2013.01)

(58) Field of Classification Search
CPC combination set(s) only.
See application file for complete search history.

(56) References Cited

U.S. PATENT DOCUMENTS

| | | | |
|---|---|---|---|
| 2010/0076637 A1* | 3/2010 | Ueoka ..................... | B60T 7/042 701/22 |
| 2010/0089673 A1* | 4/2010 | Wisniewski ........... | B60K 6/365 180/65.285 |
| 2012/0041630 A1* | 2/2012 | Yamamoto ............ | B60W 20/40 701/22 |
| 2012/0231926 A1* | 9/2012 | Erbguth ................ | B60W 10/08 477/93 |

FOREIGN PATENT DOCUMENTS

| | | |
|---|---|---|
| JP | 2008-120141 A | 5/2008 |
| JP | 2008-167540 A | 7/2008 |

* cited by examiner

*Primary Examiner* — Thomas G Black
*Assistant Examiner* — Ana Thomas
(74) *Attorney, Agent, or Firm* — Dinsmore & Shohl LLP

(57) ABSTRACT

When a basic creep torque Tctmp is a positive value and a braking torque demand Trb* is a negative value, the control procedure sets a basic reflection rate Rctmp based on the braking torque demand Trb* (S240). In a state of non-activation of vehicle distance control (S250), the control procedure sets a target reflection rate Rc* using the basic reflection rate Rctmp directly (S230). In a state of activation of vehicle distance control (S250), the control procedure sets the target reflection rate Rc* using a guarded reflection rate Rcgd obtained by guarding the lower limit of the basic reflection rate Rctmp with a previous value of the target reflection rate (previous Rc*) in a previous cycle (S270 and S280).

10 Claims, 8 Drawing Sheets

MOTOR VEHICLE HAVING CREEP TORQUE CONTROL

BACKGROUND OF THE INVENTION

1. Field of the Invention

The present invention relates to a motor vehicle and more specifically pertains to a motor vehicle including a motor configured to input and output power for running and a braking force applying device configured to apply braking force to the vehicle.

2. Description of the Prior Art

A proposed configuration of a motor vehicle includes a motor for running linked with drive wheels and a brake unit configured to apply a braking force to the drive wheels and controls the motor to output a creep torque which is obtained by multiplying a driving force demand based on the accelerator position (value 0) and the vehicle speed by a creep torque reflection rate (see, for example, JP 2008-167540A). This motor vehicle sets the smaller between a first reflection rate having an increasing tendency with a decrease in vehicle speed and a second reflection rate having a decreasing tendency with an increase in operating amount of a brake pedal to the creep torque reflection rate. The motor vehicle updates (resets) the creep torque reflection rate to the value 0 during a vehicle stop in the brake-on state, and determines that brake-holding control is performed and reduces and updates the creep torque reflection rate when the brake hydraulic pressure is greater than a predetermined value in the brake-off state. This reduces the creep torque under application of the braking force to the vehicle and suppresses unnecessary power consumption by the motor.

Another proposed configuration of a motor vehicle has an adaptive cruise control (ACC) system with vehicle distance control which performs constant-speed control of running with keeping a set vehicle speed and automatic following control (following travel control and following stop control) of running and stopping the vehicle following a preceding vehicle (see, for example, JP 2008-120141A). This ACC system sets a first range immediately after the preceding vehicle and a second range behind the first range in the following stop control and outputs the deceleration according to whether the own vehicle runs in an area behind the second range, in the second range or in the first range. This system aims to securely stop the own vehicle according to the following distance from the preceding vehicle.

Patent Document 1: Japanese Patent Laid-Open No. JP 2008-167540A
Patent Document 2: Japanese Patent Laid-Open No. JP 2008-120141A

SUMMARY OF THE INVENTION

According to a recent trend, in order to ensure a smooth vehicle stop when the vehicle is decelerated to stop during activation of the ACC system, the brake unit or the like automatically performs a depression-reducing operation simulating process of simulating the driver's reduction in depression of a brake pedal immediately before a vehicle stop. In application of this process to the above motor vehicle, on the assumption that the creep torque reflection rate is set in the same manner in the state of activation of the ACC system and in the state of non-activation of the ACC system. In this case, when a relatively large braking demand (demand corresponding to the operating amount of the brake pedal in the state of non-activation of the ACC system) is given under the following stop control, the creep torque reflection rate becomes equal to the value 0 and subsequently increases from the value 0 by the depression-reducing operation simulating process (the output state of the creep torque changes from shutdown of output to output by the depression-reducing operation simulating process). This may cause the driver to feel uncomfortable, for example, idling.

The motor vehicle of the invention aims to suppress the driver from feeling uncomfortable when the vehicle is decelerated to stop during running with vehicle distance control of running and stopping the vehicle with adjusting a following distance from a preceding vehicle.

In order to solve at least part of the problems described above, the motor vehicle of the invention may be implemented by the following aspects.

According to one aspect, there is provided a motor vehicle including: a motor configured to input and output power for running; a braking force applying device configured to apply braking force to the motor vehicle; and a controller configured to perform vehicle distance control of controlling the motor and the braking force applying device to run and stop the motor vehicle with adjusting a following distance from a preceding vehicle, wherein at a during-run creep and braking request time when an output demand for a creep torque and a braking demand are given during running, the controller controls the motor such as to reduce a decrease of the creep torque in a state of activation of the vehicle distance control compared with in a state of non-activation of the vehicle distance control, while controlling the braking force applying device to apply a braking force corresponding to the braking demand to the motor vehicle.

The motor vehicle of this aspect performs the vehicle distance control of controlling the motor and the braking force applying device to run and stop the motor vehicle with adjusting a following distance from a preceding vehicle, in response to an instruction to perform cruise control. At the during-run creep and braking request time when an output demand for the creep torque and a braking demand are given during running, the motor vehicle of this aspect controls the motor such as to reduce a decrease in creep torque (to suppress limitation of the creep torque) in the state of activation of the vehicle distance control compared with in the state of non-activation of the vehicle distance control, while controlling the braking force applying device to apply a braking force corresponding to the braking demand to the motor vehicle. As described above, reduction of the creep torque at the during-run creep and braking request time in the state of activation of the vehicle distance control is reduced (limitation of output of the creep torque is suppressed), compared with at the during-run creep and braking request time in the state of non-activation of the vehicle distance control. This suppresses a decrease of the creep torque (especially, shutdown of output of the creep torque), compared with the procedure of decreasing the creep torque irrespective of at the during-run creep and braking request time in the state of activation of the vehicle distance control or at the during-run creep and braking request time in the state of non-activation of the vehicle distance control. This suppresses change between output and no output of creep torque and accordingly suppresses the driver from feeling unconformable due to the change between output and no output of creep torque. For example, when the vehicle is decelerated to stop in the state of activation of the vehicle distance control, this suppresses a change of the output state of the creep torque from shutdown of output to output in a depression-reducing operation simulating process of simulating the driver's reduction in depression of a brake pedal immediately before a vehicle stop, and accordingly suppresses the driver from feeling uncomfortable, for example, idling.

The "output demand for the creep torque" may be an identical value or may be different values in the state that a braking demand is given and in the state that no braking demand is given. The "braking demand" may be a request based on the driver's braking operation in the state of non-activation of the vehicle distance control and may be a request based on the following distance in the state of activation of the vehicle distance control. The control of "reducing a decrease of the creep torque in the state of activation of the vehicle distance control compared with in the state of non-activation of the vehicle distance control" includes not only control of decreasing the creep torque by a smaller degree in the state of activation of the vehicle distance control than a degree in the state of non-activation of the vehicle distance control, but control of preventing a decrease of the creep torque. Additionally, when a braking force is applied to the motor vehicle by the vehicle distance control, the controller may control the motor and the braking force applying device to perform the depression-reducing operation simulating process of simulating the driver's reduction in depression of the brake pedal immediately before a vehicle stop.

In the motor vehicle of the above aspect, at the during-run creep and braking request time in the state of activation of the vehicle distance control, the controller may control the motor and the braking force applying device to output the creep torque, irrespective of magnitude of a braking demand by the vehicle distance control. This aspect further suppresses the change between output and no output of the creep torque. In the motor vehicle of the above aspect, at the during-run creep and braking request time in the state of activation of the vehicle distance control, the controller may control the motor and the braking force applying device to prevent the creep torque from decreasing, irrespective of the magnitude of the braking demand by the vehicle distance control. This suppresses a change of the creep torque.

In the motor vehicle of the above aspect, at the during-run creep and braking request time, the controller may set a greater threshold value of the braking demand to shutdown output of the creep torque in the state of activation of the vehicle distance control than a threshold value in the state of non-activation of the vehicle distance control. This suppresses shutdown of output of the creep torque at the during-run creep and braking request time in the state of activation of the vehicle distance control, compared with in the state of non-activation of the vehicle distance control.

Additionally, in the motor vehicle of the above aspect, when an output demand for the creep torque is given, the controller may multiply a basic creep torque by a target reflection rate to set a target creep torque and control the motor using the set target creep torque, and at the during-run creep and braking request time, the controller may set the target reflection rate with tendency to be a larger value in the state of activation of the vehicle distance control than a value in the state of non-activation of the vehicle distance control.

In the motor vehicle of the above aspect that sets the target reflection rate with tendency to be the larger value in the state of activation of the vehicle distance control than the value in the state of non-activation of the vehicle distance control at the during-run creep and braking request time, at a vehicle distance control-travel creep request time when an output demand for the creep torque is given in the state of activation of the vehicle distance control, the controller may prevent the target reflection rate from decreasing, irrespective of whether a braking demand is given by the vehicle distance control. This suppresses a change of the target reflection rate and thereby a change of the creep torque.

In the motor vehicle of the above aspect that prevents the target reflection rate from decreasing at the vehicle distance control-travel creep request time, at the vehicle distance control-travel creep request time, the controller may set the target reflection rate by guarding the basic reflection rate with a previous value of the target reflection rate, irrespective of whether the braking demand is given by the vehicle distance control.

In the motor vehicle of the above aspect that prevents the target reflection rate from decreasing at the vehicle distance control-travel creep request time, when the vehicle distance control-travel creep request time comes associated with a decrease in vehicle speed in the state of activation of the vehicle distance control, the controller may subsequently keep the target reflection rate at a predetermined positive value, irrespective of whether the braking demand is given by the vehicle distance control. This further suppresses a change of the target reflection rate.

In the motor vehicle of the above aspect that sets the target reflection rate with tendency to be the larger value in the state of activation of the vehicle distance control than the value in the state of non-activation of the vehicle distance control at the during-run creep and braking request time, at the during-run creep and braking request time, the controller may set a threshold value of the braking demand, which makes the target reflection rate equal to a value 0, in the state of activation of the vehicle distance control than a threshold value in the state of non-activation of the vehicle distance control. This suppresses the target reflection rate from decreasing to the value 0 (suppresses shutdown of output of the creep torque) at the during-run creep and braking request time in the state of activation of the vehicle distance control, compared with at the during-run creep and braking request time in the state of non-activation of the vehicle distance control.

In the motor vehicle of the above aspect, the controller may control the motor and the braking force applying device such as not to output the creep torque when the motor vehicle stops in the state of activation of the vehicle distance control. This suppresses power consumption by the motor.

DESCRIPTION OF THE PREFERRED EMBODIMENTS

The following describes aspects of the invention with reference to some embodiments.

Figure 1:
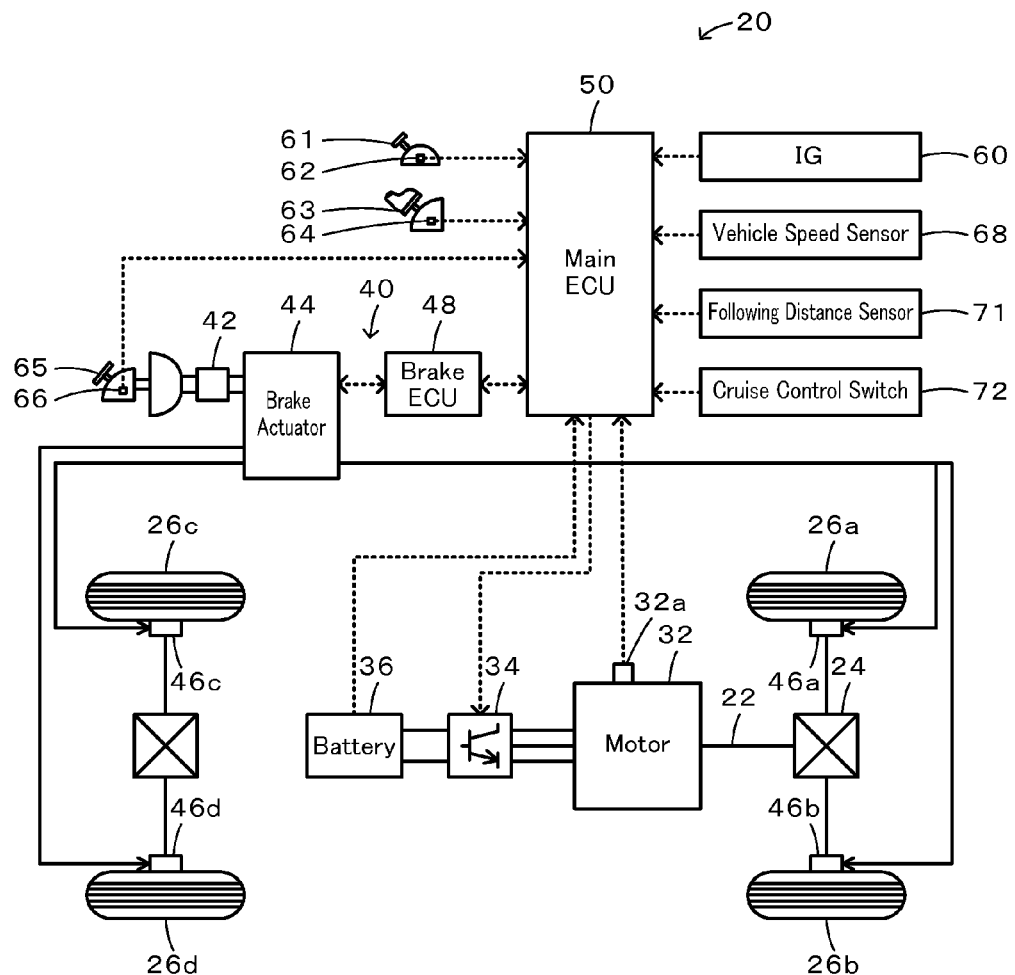
FIG. 1 is a configuration diagram illustrating the general configuration of an electric vehicle according to one embodiment of the invention.

FIG. 1 is a configuration diagram illustrating the general configuration of an electric vehicle 20 according to one embodiment of the invention. As illustrated, the electric vehicle 20 of the embodiment has a motor 32 provided as, for example, a synchronous motor generator and configured to input and output power to and from a driveshaft 22 connected with drive wheels 26*a*, 26*b* via a differential gear 24, an inverter 34 configured to drive the motor 32, a battery 36 provided as, for example, a lithium ion secondary battery and configured to transmit electric power to and from the motor 32 via the inverter 34, a brake unit 40 configured to apply a mechanical braking force to the drive wheels 26*a*, 26*b* and driven wheels 26*c* and 26*d*, and a main electronic control unit (hereinafter referred to as main ECU) 50 configured to control the whole vehicle.

The brake unit 40 includes a master cylinder 42 pressurized by depression of a brake pedal 65, a brake actuator 44 configured to adjust hydraulic pressures to be applied to brake wheel cylinders 46*a*, 46*b*, 46*c* and 46*d* for the drive wheels 26*a* and 26*b* and the driven wheels 26*c* and 26*d*, and a brake electronic control unit (hereinafter referred to as brake ECU) configured to control the brake actuator 44.

The brake actuator 44 is configured to adjust the hydraulic pressures of the brake wheel cylinders 46*a*, 46*b*, 46*c* and 46*d*, in order to apply a braking force corresponding to a share by the brake out of the braking force to be applied to the vehicle according to the pressure of the master cylinder 42 and vehicle speed V, to the drive wheels 26*a* and 26*b* and the driven wheels 26*c* and 26*d*. The brake actuator 44 is also configured to adjust the hydraulic pressures to be applied to the brake wheel cylinders 46*a*, 46*b*, 46*c* and 46*d*, in order to apply a braking force to the drive wheels 26*a* and 26*b* and the driven wheels 26*c* and 26*d*, irrespective of depression of the brake pedal 65.

The brake ECU 48 is implemented by a microprocessor with a CPU although not being specifically illustrated and includes a ROM configured to store a processing program, a RAM configured to temporarily store data, input and output ports and a communication port, as well as the CPU. The brake ECU 48 inputs, via the input port, a master cylinder pressure (brake pedal force Fb) detected by a non-illustrated pressure sensor mounted to the master cylinder 42, wheel speeds from non-illustrated wheel speed sensors mounted to the drive wheels 26*a* and 26*b* and the driven wheels 26*c* and 26*d* and a steering angle from a non-illustrated steering sensor, and outputs, via the output port, for example, a drive control signal to the brake actuator 44. The brake ECU 48 inputs signals indicating, for example, the wheel speeds of the drive wheels 26*a* and 26*b* and the driven wheels 26*c* and 26*d* from the wheel speed sensors and the steering angle from the steering angle sensor and activates antilock brake system (ABS) that prevents any of the drive wheels 26*a* and 26*b* and the driven wheels 26*c* and 26*d* from being locked and slipped when the driver depresses the brake pedal 65, traction control (TRC) that prevents either of the drive wheels 26*a* and 26*b* from idling and being slipped when the drive depresses an accelerator pedal 63, and vehicle stability control (VSC) that stabilizes the attitude during a turn of the vehicle. This brake ECU 48 makes communication with the main ECU 50 to drive and control the brake actuator 44 in response to control signals from the main ECU 50 and output data regarding the respective wheel speeds and the state of the actuator 44 to the main ECU 50 as needed basis.

The main ECU 50 is implemented by a microprocessor with a CPU although not being specifically illustrated and includes a ROM configured to store a processing program, a RAM configured to temporarily store data, input and output ports and a communication port, as well as the CPU. The main ECU 50 inputs, via the input port, a rotational position $\theta m$ of a rotor of the motor 32 from a rotational position detection sensor 32*a* configured to detect the rotational position of the rotor of the motor 32, phase currents Iu, Iv and Iw from a current sensor configured to detect phase currents flowing through the respective phases of a three-phase coil of the motor 32, an inter-terminal voltage Vb from a non-illustrated voltage sensor placed between terminals of the battery 36, a charge-discharge current Ib from a non-illustrated current sensor attached to the output terminal of the battery 36, an ignition signal from an ignition switch (start switch) 60, a gearshift position SP from a gearshift position sensor 62 configured to detect the operating position of a gearshift lever 61, an accelerator position of accelerator opening Acc from an accelerator pedal positions sensor 64 configured to detect the amount of depression of the accelerator pedal 63, a brake pedal position BP from a brake pedal position sensor 66 configured to detect the amount of depression of the brake pedal 65, a vehicle speed V from a vehicle speed sensor 68, a road surface gradient $\theta$ from a gradient sensor, a following distance D from a preceding vehicle from a following distance sensor 71, and a switch signal from a cruise control switch 72 configured to enable adaptive cruise control (constant-speed control of running with automatically keeping the vehicle speed substantially constant or vehicle distance control of running the vehicle (following vehicle travel) and stopping the vehicle (following vehicle stop) with automatically keeping the following distance from the preceding vehicle substantially constant). The following distance sensor 71 employed may be, for example, a sensor that uses laser beam, electromagnetic wave or ultrasonic wave to detect the following distance D from the preceding vehicle or a sensor that uses information from a GPS satellite to detect the following distance D. The cruise control switch 72 is turned to an ON position or an OFF position and is additionally configured to enable a target following distance D* and a target vehicle speed V* to be set by the driver in the ON position. The main ECU 50 outputs, via the output port, for example, a switching control signal to switching elements of the inverter 34. This main ECU 50 computes a rotating speed Nm of the motor 3, based on the rotational position of the rotor of the motor 32 from the rotational position detection sensor, and computes a state of charge SOC that represents a ratio of the capacity of power dischargeable from the battery 36 to the full capacity, based on an integral value of the charge-discharge current Ib of the battery 36 from the current sensor. The main ECU 50 is connected with the brake ECU 48 to allow communication with the brake ECU 48 and transmit various control signals and data to and from the brake ECU 48.

In the electric vehicle 20 of the embodiment having the above configuration, in the OFF position of the cruise control switch 72, the main ECU 50 sets a torque demand Tr* (hereinafter also called driving torque demand Trd* for positive values and braking torque demand Trb* for negative values) required for the driveshaft 22 according to the accelerator position Acc, the brake pedal position BP and the vehicle speed V, and sets a torque command Tm* of the motor 32 and a brake torque command Tb* of the brake unit 40 to drive the vehicle with the set torque demand Tr*. The main ECU 50 then controls switching of switching elements of the inverter 34 to drive the motor 32 with the set torque command Tm*, while sending the brake torque command Tb* to the brake ECU 48. When receiving the brake torque command Tb*, the brake ECU 48 drives and controls the brake actuator 44, so as to cause the braking force by the brake wheel cylinders 46a to 46d in conversion to the torque for the driveshaft 22 to satisfy a torque corresponding to the brake torque command Tb*. The brake torque command Tb* is set to the value 0, when the torque demand Tr* is a positive value (driving torque demand Trd*) or when the torque demand Tr* is a negative value (braking torque demand Trb*) and is satisfied by only regenerative operation of the motor 32.

In the electric vehicle 20 of the embodiment, in the ON position of the cruise control switch 72, the main ECU 50 performs the constant-speed control or the vehicle distance control as the adaptive cruise control. It may be determined which of the constant-speed control and the vehicle distance control is to be performed, for example, based on the presence or the absence of any preceding vehicle.

During the constant-speed control, the main ECU 50 sets the torque demand Tr* (driving torque demand Trd* or braking torque demand Trb*) to make the vehicle speed V approach to the target vehicle speed V*, sets the torque command Tm* of the motor 32 and the brake torque command Tb* of the brake unit 40 to drive the vehicle with the set torque demand Tr*, and controls the motor 32 (inverter 34) based on the set torque command Tm*, while sending the brake torque command Tb* to the brake ECU 48. In response to receiving the brake torque command Tb*, the brake ECU 48 drives and controls the brake actuator 44 based on the brake torque command Tb*. This enables the vehicle to run at the target vehicle speed V*.

During the vehicle distance control, when the own vehicle runs, the main ECU 50 sets the torque demand Tr* (driving torque demand Trd* or braking torque demand Trb*) to make the following distance D approach to the target following distance D*, sets the torque command Tm* of the motor 32 and the brake torque command Tb* of the brake unit 40 to drive the vehicle with the set torque demand Tr*, and controls the motor 32 (inverter 34) based on the set torque command Tm*, while sending the brake torque command Tb* to the brake ECU 48. In response to receiving the brake torque command Tb*, the brake ECU 48 drives and controls the brake actuator 44 based on the brake torque command Tb*. This allows for the following vehicle travel and the following vehicle stop with respect to the preceding vehicle. During the vehicle distance control, when both the preceding vehicle and the own vehicle are at stop, the main ECU 50 sets the brake torque command Tb* of the brake unit 40 to keep the vehicles at stop and sends the set brake torque command Tb* to the brake ECU 48. In response to receiving the brake torque command Tb*, the brake ECU 48 drives and controls the brake actuator 44 based on the brake torque command Tb*. This enables the vehicle to be kept at stop. When the driver subsequently operates the accelerator pedal after a start of the preceding vehicle, the vehicle starts running and resumes the following vehicle travel with respect to the preceding vehicle.

According to the embodiment, such cruise control is deactivated, for example, in response to depression of the brake pedal 65, a change of the gearshift position, or a decrease in vehicle speed V below a predetermined vehicle speed (for example, 30 km/h or 40 km/h) during the constant-speed control, in addition to turning off of the cruise control switch 72.

When the vehicle speed V is lower than a specified vehicle speed V1 (for example, 10 km/h or 12 km/h) (i.e., in a creep vehicle speed range), regardless of the ON position or the OFF position of the cruise control switch 72, the control procedure of this embodiment sets the torque demand Tr* (driving torque demand Trd* or braking torque demand Trb*) having its lower limit guarded by a target creep torque Tc* described later to the torque command Tm* of the motor 32 and sets the brake torque command Tb* of the brake unit 40 to satisfy the torque demand Tr*. Accordingly, when the vehicle speed V is lower than the specified vehicle speed V1 in the accelerator-off or its equivalent state, the control procedure sets the target creep torque Tc* to the torque command Tm* of the motor 32 and controls the motor 32 (inverter 34), while setting the brake torque command Tb* of the brake unit 40 to satisfy the torque demand Tr* and controlling the brake unit 40 (brake actuator 44). The accelerator-off or its equivalent state herein includes the state that the cruise control switch 72 is in the OFF position and that the accelerator position Acc is the value 0 and the state that cruise control switch 72 is in the ON position and that the torque demand Tr* is equal to or less than a basic creep torque Tctmp as a basic value of the target creep torque Tc*.

Figure 2:
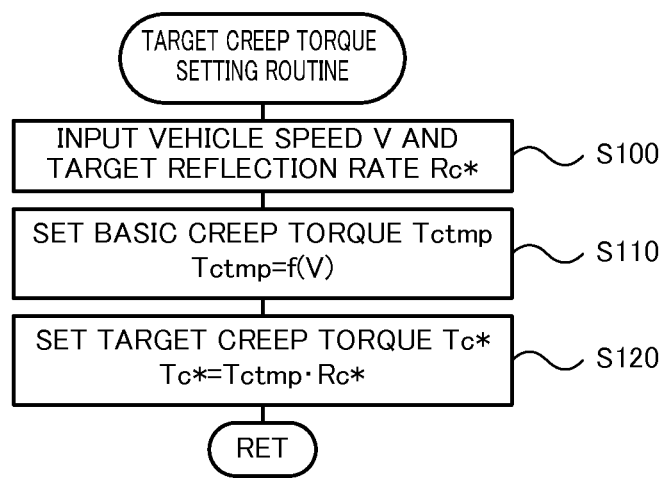
FIG. 2 is a flowchart showing one example of a target creep torque setting routine performed by a main ECU according to the embodiment.

The following describes the operations of the electric vehicle 20 of the embodiment having the above configuration or more specifically the operations in the accelerator-off or its equivalent state when the vehicle speed V is lower than the specified vehicle speed V1. FIG. 2 is a flowchart showing one example of a target creep torque setting routine performed by the main ECU 50 according to the embodiment. This routine is performed repeatedly in the accelerator-off or its equivalent state when the vehicle speed V is lower than the specified vehicle speed V1.

On the start of the target creep torque setting routine, the main ECU 50 inputs the vehicle speed V from the vehicle speed sensor 68 and a target reflection rate Rc* set by a target reflection rate setting routine described later (step S100). The main ECU 50 subsequently sets the basic creep torque Tctmp according to the vehicle speed V (step S110), multiplies the set basic creep torque Tctmp by the target reflection rate Rc* to set the target creep torque Tc* (step S120) and terminates the routine. After setting the target creep torque Tc*, the control procedure of the embodiment controls the motor 32 (inverter 34) based on the set target creep torque Tc*.

Figure 3:
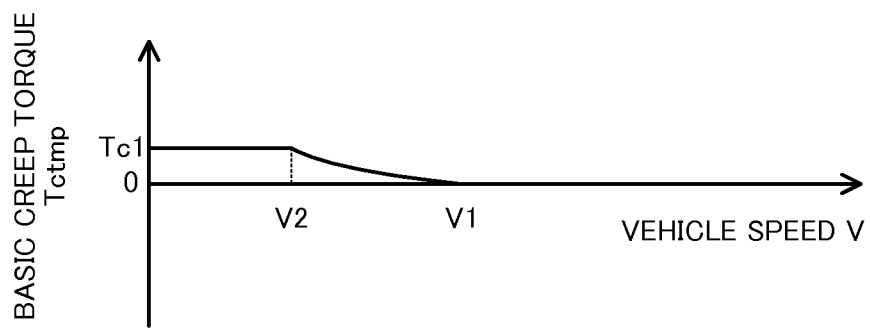
FIG. 3 is a diagram illustrating one example of a basic creep torque setting map according to the embodiment.

With respect to the basic creep torque Tctmp, the procedure of the embodiment specifies a relationship between the vehicle speed V and the basic creep torque Tctmp and stores the specified relationship as a basic creep torque setting map in advance in the non-illustrated ROM. When the vehicle speed V is given, the procedure of the embodiment reads the basic creep torque Tctmp corresponding to the given vehicle speed V from the stored map and sets the basic creep torque Tctmp. One example of the basic creep torque setting map is shown in FIG. 3. As illustrated, the basic creep torque Tctmp is set to a predetermined value Tc1 in a range where the vehicle speed V is equal to or lower than a predefined vehicle speed V2 (for example, 7 km/h or 8 km/h) which is lower than the specified vehicle speed V1, and is set to decrease from the predetermined value Tc1 toward the value 0 with an increase in vehicle speed V in a range where the vehicle speed V is higher than the predefined vehicle speed V2 but is lower than the specified vehicle speed V1. The predetermined value Tc1 is determined according to the vehicle specification. Accordingly, in the state that the vehicle speed V is equal to or lower than the predefined vehicle speed V2, the target creep torque Tc* is constant as long as the target reflection rate Rc* is kept constant. In the state that the vehicle speed V is higher than the predefined vehicle speed V2 but is lower than the specified vehicle speed V1, on the other hand, the target creep torque Tc* is changed according to the vehicle speed V even when the target reflection rate Rc* is kept constant at a positive value. According to the embodiment, the value 0 is set to the basic creep torque Tctmp which is used in the target reflection rate setting routine described below, when the vehicle speed V is equal to or higher than the specified vehicle speed V1 or in the state other than the accelerator-off or its equivalent state.

Figure 4:
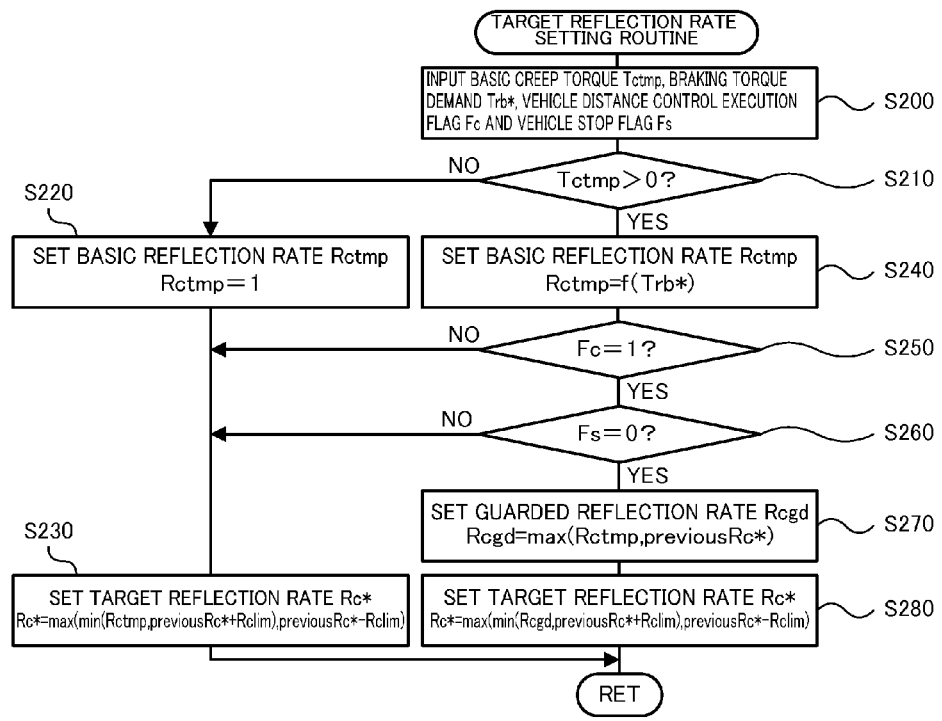
FIG. 4 is a flowchart showing one example of a target reflection rate setting routine performed by the main ECU according to the embodiment.

The following describes a process of setting the target reflection rate Rc* used in the target creep torque setting routine of FIG. 2. FIG. 4 is a flowchart showing one example of a target reflection rate setting routine performed by the main ECU 50 according to the embodiment. This routine is performed repeatedly.

On the start of the target reflection rate setting routine, the main ECU 50 inputs data such as the basic creep torque Tctmp, the braking torque demand Trb*, a vehicle distance control execution flag Fc indicating whether the vehicle distance control is performed as the cruise control and a vehicle stop flag Fs indicating whether the vehicle (own vehicle) is at stop (step S200). The basic creep torque Tctmp read and input here is the basic creep torque Tctmp set by the target creep torque setting routine of FIG. 2. The braking torque demand Trb* read and input here has been set to the value 0 when the torque demand Tr* is equal to or greater than the value 0, and has been set to the torque demand Tr* when the torque demand Tr* is a negative value. The vehicle distance control execution flag Fc read and input here has been set to the value 1 when the vehicle distance control is performed, and has been set to the value 0 when the vehicle distance control is not performed. The vehicle stop flag Fs read and input here has been set to the value 1 when the vehicle is at stop, and has been set to the value 0 when the vehicle is not at stop.

After inputting the data, the main ECU 50 determines whether the input basic creep torque Tctmp is a positive value or the value 0 (step S210). This determination process determines whether a creep torque is to be output from the motor 32 when the target reflection rate Rc* is a positive value or no creep torque is to be output from the motor 32 irrespective of whether the target reflection rate Rc* is a positive value or not.

When the basic creep torque Tctmp is the value 0, it is determined that no creep torque is to be output from the motor 32 irrespective of whether the target reflection rate Rc* is a positive value or not. The main ECU 50 then sets a basic reflection rate Rctmp to the value 1 (step S220), sets a target reflection rate Rc* by a rating process using a rating value Rclim with respect to the basic reflection rate Rctmp according to Equation (1) given below (step S230), and terminates the routine. The rating value Rclim used here is a value that is determined by taking into account, for example, the characteristics of the motor 32 and the driver's ride quality and enables the target reflection rate Rc* to follow the basic reflection rate Rctmp relatively quickly and smoothly in response to a change of the basic reflection rate Rctmp. Since the basic creep torque Tctmp is the value 0, no creep torque is output from the motor 32.

$$Rc^* = \max(\min(Rctmp, \text{previous } Rc^* + Rclim), \text{previous } Rc^* - Rclim) \quad (1)$$

Figure 5:
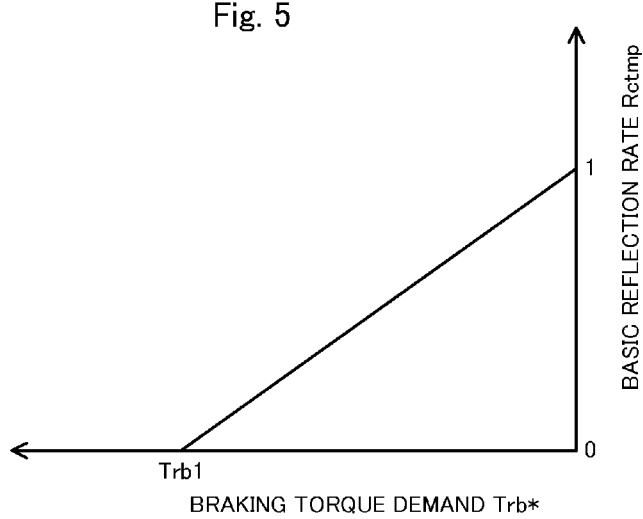
FIG. 5 is a diagram illustrating one example of a basic reflection rate setting map according to the embodiment.

When the basic creep torque Tctmp is a positive value at step S210, it is determined that a creep torque is to be output from the motor 32 when the target reflection rate Rc* is a positive value. The main ECU 50 then sets the basic reflection rate Rctmp in a range of not less than the value 0 and not greater than the value 1, based on the braking torque demand Trb* (step S240). With respect to the basic reflection rate Rctmp, the procedure of the embodiment specifies a relationship between the braking torque demand Trb* and the basic reflection rate Rctmp and stores the specified relationship as a basic reflection rate setting map in advance in the non-illustrated ROM. When the braking torque demand Trb* is given, the procedure of the embodiment reads the basic reflection rate Rctmp corresponding to the given braking torque demand Trb* from the stored map and sets the basic reflection rate Rctmp. One example of the basic reflection rate setting map is shown in FIG. 5. As illustrated, the basic reflection rate Rctmp is set to decrease from the value 1 toward the value 0 with a decrease in braking torque demand Trb* (with approaching to a specified negative value Trb1) in a range where the braking torque demand Trb* is not greater than the value 0 and is greater than (is smaller as the absolute value than) the specified negative value Trb1, and is set to the value 0 in a range where the braking torque demand Trb* is not greater than the specified value Trb1. The specified value Trb1 used here is a value having a slightly smaller absolute value than that of the braking torque demand Trb* during the vehicle distance control for the following vehicle stop or the control of keeping the vehicle at stop.

The main ECU 50 subsequently checks the set value of the vehicle distance control execution flag Fc (step S250) and checks the set value of the vehicle stop flag Fs (step S260). When the vehicle distance control execution flag Fc is the value 0 or when the vehicle stop flag Fs is the value 1, i.e., when the vehicle distance control is not performed or when the vehicle is at stop, the main ECU 50 sets the target reflection rate Rc* by the rating process using the rating value Rclim with respect to the basic reflection rate Rctmp according to Equation (1) given above (step S230), and terminates the routine. As described above, when the braking torque demand Trb* is equal to or less than the specified value Trb1, the basic reflection rate Rctmp is the value 0. The target reflection rate Rc* is accordingly set to the value 0 by the rating process, so that no creep torque is to be output from the motor 32. Such control suppresses power consumption by the motor 32 in the state that the braking torque demand Trb* is sufficiently small (large as the absolute value) due to significant depression of the brake pedal 65 when the vehicle distance control is not performed or in the state that the braking torque demand Trb* is sufficiently small due to the control of keeping the vehicle at stop during the vehicle distance control.

When the vehicle distance control execution flag Fc is the value 1 at step S250 and the vehicle stop flag Fs is the value 0 at step S260, i.e., when the vehicle distance control is performed and when the vehicle is not at stop (is running), the main ECU 50 sets a guarded reflection rate Rcgd by guarding the lower limit of the basic reflection rate Rctmp set at step S240 with a previous value of the target reflection rate (previous Rc*) set in a previous cycle of this routine according to Equation (2) given below (step S270), sets the target reflection rate Rc* by the rating process using the rating value Rclim with respect to the guarded reflection rate Rcgd according to Equation (3) rewritten from Equation (1) above with substitution of "Rctmp" by "Rcgd" (step S280), and terminates this routine. This process prevents the target reflection rate Rc* from decreasing while the vehicle runs at the vehicle speed V of not higher than the specified vehicle speed V1 during the vehicle distance control. Accordingly, the target reflection rate Rc* tends to be the larger setting in a state of activation of the vehicle distance control than the setting in a state of non-activation of the vehicle distance control. This suppresses a decrease of the target reflection rate Rc* (especially to the value 0) in the state of activation of the vehicle distance control, compared with in the state of non-activation of the vehicle distance control. This suppresses fluctuation of the target reflection rate Rc* between the positive value and the value 0 associated with a change of the braking torque demand Trb*, i.e., suppresses change between output and no output of creep torque from the motor 32. This accordingly suppresses the driver from feeling unconformable due to the change between output and no output of creep torque.

$$Rcgd=\max(Rctmp,\text{previous } Rc^*) \quad (2)$$

$$Rc^*=\max(\min(Rcgd,\text{previous } Rc^*+Rclim),\text{previous } Rc^*-Rclim) \quad (3)$$

It is here assumed that the vehicle speed V decreases across the specified vehicle speed V1 in the state of activation of the vehicle distance control. When the vehicle speed V is equal to or higher than the specified vehicle speed V1, the basic reflection rate Rctmp is set to the value 1 and the target reflection rate Rc* is set to the value 1. After the vehicle speed V decreases below the specified vehicle speed V1, the target reflection rate Rc* is kept at the value 1 irrespective of the value of the braking torque demand Trb* until the vehicle distance control is deactivated (terminated) or the vehicle stops. This suppresses a change of the target reflection rate Rc* and thereby a change of the target creep torque Tc* associated with a change of the braking torque demand Trb* when the vehicle runs at the vehicle speed V of lower than the specified vehicle speed V1 by the vehicle distance control. Especially, when the vehicle speed V is equal to or lower than the predefined vehicle speed V2, the basic creep torque Tctmp is kept constant at the predetermined value Tc1, so that the target creep torque Tc* is kept constant at the predetermined value Tc1. This further suppresses a change of the target creep torque Tc*. When the vehicle is decelerated to stop in the state of activation of the vehicle distance control, this suppresses an increase of the target reflection rate Rc* and thereby an increase of the target creep torque Tc* by a process of simulating the driver's reduction in depression of the brake pedal 65 immediately before the vehicle stop and slightly increasing the braking torque demand Trb* (decreasing as the absolute value) (hereinafter called depression-reducing operation simulating process). This suppresses the driver from feeling uncomfortable, for example, idling.

It is assumed that the vehicle distance control is triggered in response to the setting of the cruise control switch 72 to the ON position during running at the vehicle speed V of lower than the specified vehicle speed V1 or during a vehicle stop. The basic reflection rate Rctmp and thereby the target reflection rate Rc* have been set according to the braking torque demand Trb* until immediately before the start of the vehicle distance control. When the vehicle distance control is triggered, the basic reflection rate Rctmp and thereby the target reflection rate Rc* are kept at the value 0 during the control of keeping the vehicle at stop. During running (including a start of running with deactivating the control of keeping the vehicle at stop), on the other hand, the target reflection rate Rc* is the value having the lower limit guarded by the previous target reflection rate (previous Rc*). The target reflection rate Rc* is accordingly kept unchanged in the state that the magnitude of the braking torque demand Trb* is increased by the vehicle distance control, is either kept unchanged or is increased in the state that the magnitude of the braking torque demand Trb* is decreased by the vehicle distance control, and is kept at the value 1 after the target reflection rate Rc* is set to the value 1. This suppresses a change of the target reflection rate Rc* and thereby a change of the target creep torque Tc* by non-decrease of the target reflection rate Rc* associated with a change of the braking torque demand Trb* (a decrease after increasing or an increase after decreasing).

Figure 6:
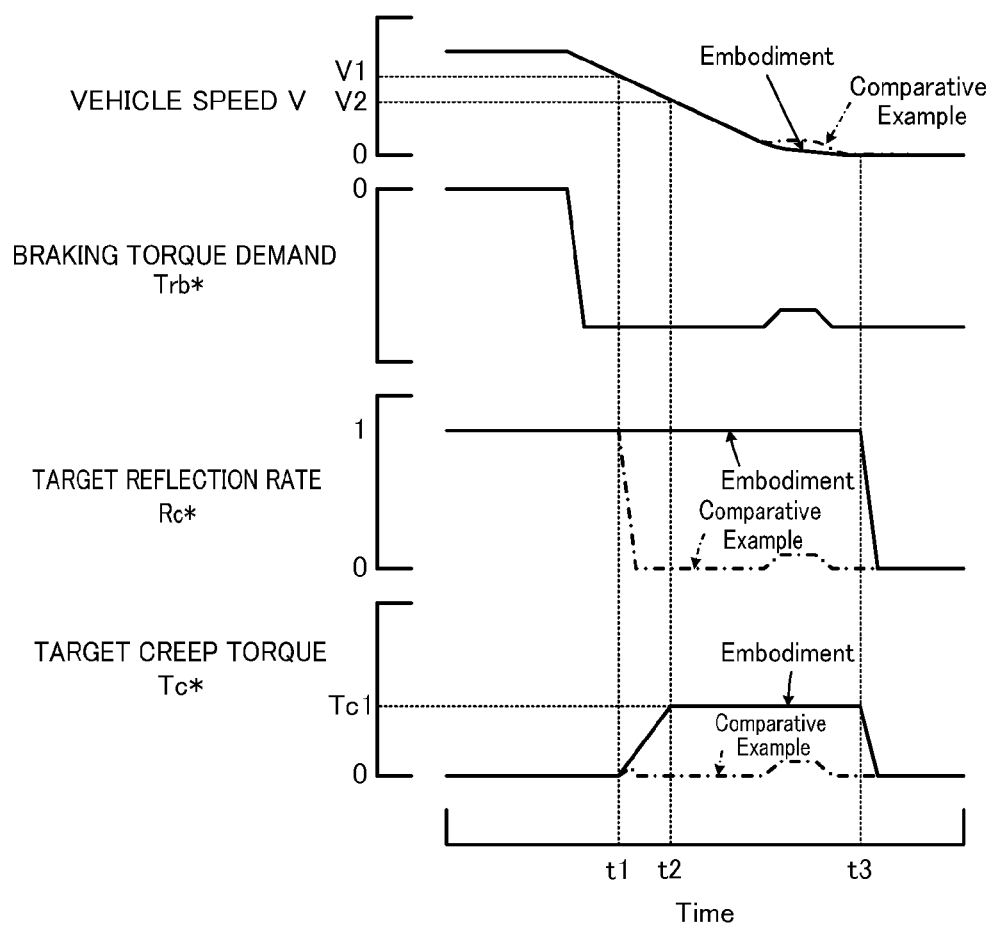
FIG. 6 is a diagram illustrating one example of time changes in vehicle speed V, braking torque demand Trb*, target reflection rate Rc* and target creep torque Tc* in the state that the vehicle speed V is decreased to a stop during running with vehicle distance control.

FIG. 6 is a diagram illustrating one example of time changes in vehicle speed V, braking torque demand Trb*, target reflection rate Rc* and target creep torque Tc* in the stat that the vehicle speed V is decreased to a stop in the state of activation of the vehicle distance control. In the diagram, solid-line curves represent the state of the embodiment, and dashed dotted-line curves represent the state of a comparative example that decreases the target reflection rate Rc* to the value 0 (the value according to the braking torque demand Trb*) when the vehicle speed V is decreased below the specified vehicle speed V1. As illustrated, with respect to both the embodiment and the comparative example, when the vehicle speed V is not lower than the specified vehicle speed V1 (until a time t1), the target reflection rate Rc* is the value 1, irrespective of the value of the braking torque demand Trb*, but the basic creep torque Tctmp is the value 0, so that the target creep torque Tc* is the value 0. With respect to the comparative example, when the vehicle speed V is subsequently decreased below the specified vehicle speed V1, the target reflection rate Rc* is changed to the value 0 and is kept at the value 0, so that the target creep torque T* is either kept at the value 0 or becomes slightly greater than the value 0 temporarily before the target reflection rate Rc* becomes equal to the value 0. The subsequent depression-reducing operation simulating process decreases the magnitude of the braking torque demand Trb*, so that the target reflection rate Rc* and thereby the target creep torque Tc* increase from the value 0 to change the output state of creep torque from shutdown of output to output. When the vehicle speed V is decreased to a stop in the state of non-activation of the vehicle distance control, the target reflection rate Rc* and the target creep torque Tc* are changed according to the braking torque demand Trb*, like the comparative example. In the state that the cruise control switch 72 is set to the OFF position, even when the target creep torque Tc* is increased from the value 0 by the driver's reduction of depression of the brake pedal 65 (even when the output state of creep torque is changed from shutdown of output to output), this causes substantially no problem since the driver empirically recognizes the change of the output state of creep torque. When the target creep torque Tc* is increased from the value 0 by the depression-reducing operation simulating process to change the output state of creep torque from shutdown of output to output in the state of activation of the vehicle distance control (when the driver operates neither the accelerator pedal 63 nor the brake pedal 65), however, this may make the driver feel uncomfortable, for example, idling. The control procedure of the embodiment, however, keeps the target reflection rate Rc* at the value 1 (does not decrease the target reflection rate Rc*) even after the vehicle speed V is decreased below the specified vehicle speed V1. The target creep torque Tc* is accordingly increased with an increase of the basic creep torque Tctmp associated with a decrease in vehicle speed V (time t1 to time t2), and is kept constant at the predetermined value Tc1 after the vehicle speed V is decreased to or below the predefined vehicle speed V2 (after time t2). This suppresses the target reflection rate Rc* and thereby the target creep torque Tc* from being increased from the value 0 to change the output state of creep torque from shutdown of output to output by the subsequent depression-reducing operation simulating process. Accordingly this suppresses the driver from feeling uncomfortable, for example, idling. In response to detection of a vehicle stop (time t3), the control procedure of the embodiment changes the target reflection rate Rc* to the value 0 and thereby changes the target creep torque Tc* to the value 0. This suppresses power consumption by the motor 32 during a vehicle stop (during the control of keeping the vehicle at stop).

In the electric vehicle 20 of the embodiment described above, when output of the creep torque and braking are required during running (when the basic creep torque Tctmp is a positive value and the braking torque demand Trb* is a negative value), the target reflection rate Rc* tends to be the larger setting in the state of activation of the vehicle distance control than the setting in the state of non-activation of the vehicle distance control. The control procedure subsequently multiplies the basic creep torque Tctmp by the set target reflection rate Rc* to set the target creep torque Tc* and controls the motor 32 using the set target creep torque Tc*, while controlling the brake unit 40 using the braking torque demand Trb*. This reduces (suppresses) a decrease of the creep torque (especially, shutdown of output) in the state of activation of the vehicle distance control, compared with in the state of non-activation of the vehicle distance control. This suppresses change between output and no output of creep torque and accordingly suppresses the driver from feeling unconformable due to the change between output and no output of creep torque. For example, when the vehicle is decelerated to stop in the state of activation of the vehicle distance control, this suppresses an increase of the target reflection rate Rc* and thereby an increase of the target creep torque Tc* by the depression-reducing operation simulating process and accordingly suppresses the driver from feeling uncomfortable, for example, idling.

In the electric vehicle 20 of the embodiment, in the state that the basic creep torque Tctmp is a positive value in the state of activation of the vehicle distance control, the control procedure prevents the target reflection rate Rc* from decreasing, irrespective of the value of the braking torque demand Trb*. This suppresses a change of the target reflection rate Rc* and thereby a change of the target creep torque Tc* associated with a change of the braking torque demand Trb* (a decrease after increasing or an increase after decreasing).

In the electric vehicle 20 of the embodiment, when the vehicle speed V is decreased below the specified vehicle speed V1, so as to change the basic creep torque Tctmp to a positive value in the state of activation of the vehicle distance control, the target reflection rate Rc* is then kept at the value 1. This further suppresses a change of the target reflection rate Rc* and thereby a change of the target creep torque Tc* associated with a change of the braking torque demand Trb*.

In the electric vehicle 20 of the embodiment, when the vehicle speed V is lower than the specified vehicle speed V1 in the accelerator-off or its equivalent state, the basic creep torque Tctmp is set to the predetermined value Tc1 in the range where the vehicle speed V is equal to or lower than the predefined vehicle speed V2, and is set to decrease from the predetermined value Tc1 toward the value 0 with an increase in vehicle speed V in the range where the vehicle speed V is higher than the predefined vehicle speed V2 but is lower than the specified vehicle speed V1. According to a modification, the basic creep torque Tctmp may be set to the predetermined value Tc1 in the entire range where the vehicle speed V is lower than the specified vehicle speed V1. In this modification, in the case that the vehicle speed V is lower than the specified vehicle speed V1 in the accelerator-off or its equivalent state, when the target reflection rate Rc* is kept constant at a positive value, the target creep torque Tc* is also kept constant at a positive value.

In the electric vehicle 20 of the embodiment, when the basic creep torque Tctmp is a positive value in the state of activation of the vehicle distance control, the control procedure sets the basic reflection rate Rctmp based on the braking torque demand Trb*, sets the guarded reflection rate Rcgd by guarding the lower limit of the set basic reflection rate Rctmp with the previous value of the target reflection rate Rc* (previous Rc*), and multiplies the basic creep torque Tctmp by the target reflection rate Rc* based on this guarded reflection rate Rcgd to set the target creep torque Tc*. According to a modification, in the case where the basic creep torque Tctmp is a positive value, as long as a decrease in target creep torque Tc* is reduced (limitation is suppressed) in the state of activation of the vehicle distance control compared with in the state of non-activation of the vehicle distance control, any other suitable technique may be employed to set the target creep torque Tc* (target reflection rate Rc*).

Figure 7:
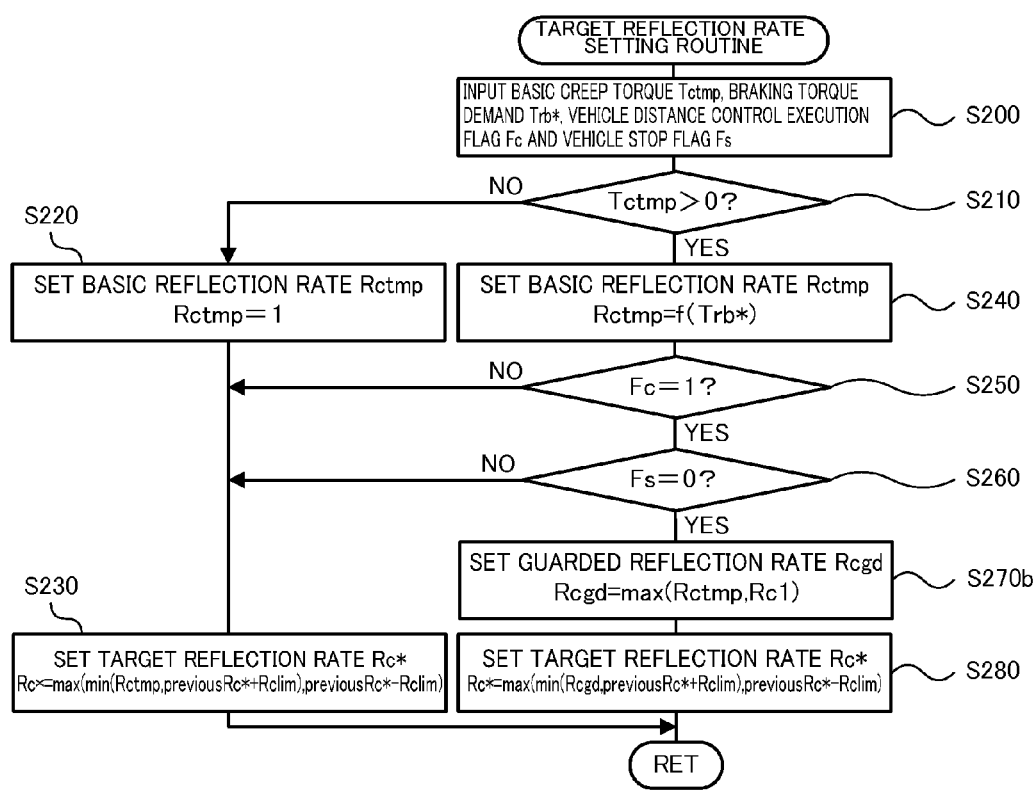
FIG. 7 is a flowchart showing another example of the target reflection rate setting routine according to one modification.
Figure 8:
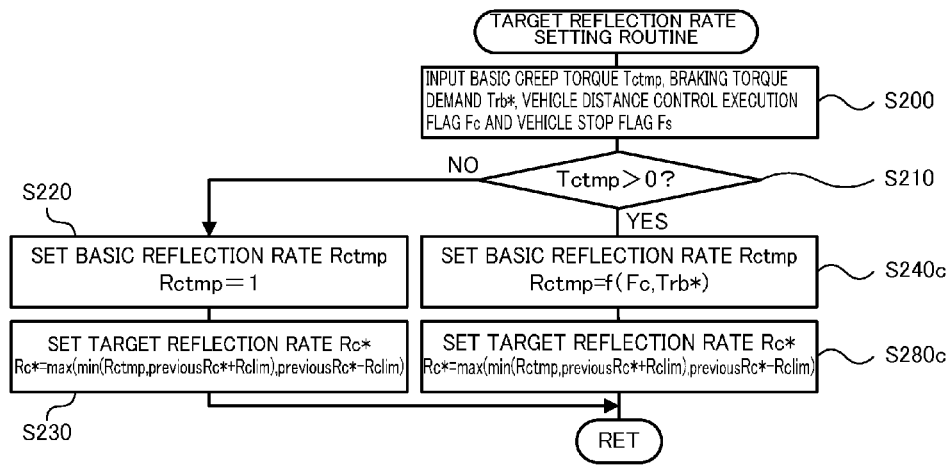
FIG. 8 is a flowchart showing another example of the target reflection rate setting routine according to another modification.

FIGS. 7 and 8 are flowcharts showing other examples of the target reflection rate setting routine performed by the main ECU 50 according to modifications. The routine of FIG. 7 is similar to the routine of FIG. 4, except that the processing of step S270b is performed in place of the processing of step S270. The routine of FIG. 8 is similar to the routine of FIG. 4, except that the processing of steps S240c and 280c is performed in place of the processing of steps S240 and S280 and that the processing of steps S250 to S270 is not performed. In the routines of FIGS. 7 and 8, the like steps to those of the routine of FIG. 4 are shown by the like step numbers and are not specifically described herein. The following sequentially describes these modified routines.

In the target reflection rate setting routine of FIG. 7, when the vehicle distance control execution flag Fc is the value 1 at step S250 and the vehicle stop flag Fs is the value 0 at step S260, i.e., when the vehicle distance control is performed and when the vehicle is not at stop (is running), the control procedure sets the guarded reflection rate Rcgd by guarding the lower limit of the basic reflection rate Rctmp with a predetermined positive value Rc1 (step S270b), sets the target reflection rate Rc* based on this guarded reflection rate Rcgd (step S280) and terminates this routine. In other words, the above embodiment does not allow for a decrease of the target reflection rate Rc*, but the routine of FIG. 7 allows for a decrease of the target reflection rate Rc* in the range of not less than the predetermined value Rc1. The predetermined value Rc1 used is preferably a larger value than the basic reflection rate Rctmp corresponding to the braking torque demand Trb* in the depression-reducing operation simulating process when the vehicle is decelerated to stop by the vehicle distance control. This modification reduces a decrease of the target creep torque Tc* (more specifically, suppresses the target creep torque Tc* from decreasing to the value 0) in the state of activation of the vehicle distance control, compared with in the state of non-activation of the vehicle distance control, in the case where the basic creep torque Tctmp is a positive value like the above embodiment, and accordingly has the similar advantageous effects to those of the above embodiment.

Figure 9:
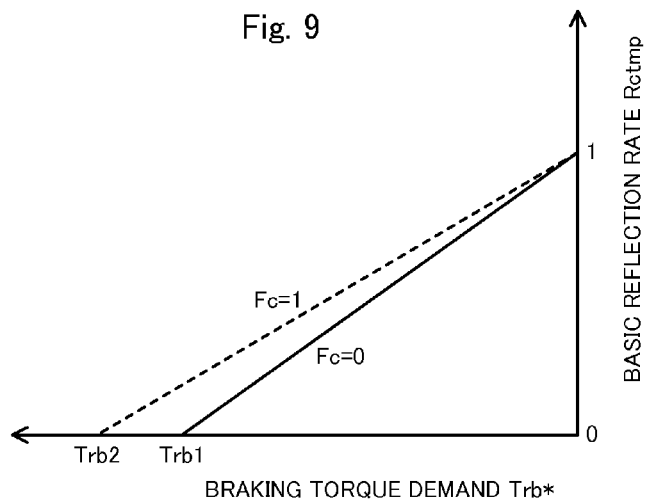
FIG. 9 is a diagram illustrating one example of the basic reflection rate setting map according to the modification of FIG. 8.

In the target reflection rate setting routine of FIG. 8, when the basic creep torque Tctmp is a positive value at step S210, the control procedure sets the basic reflection rate Rctmp in a range of not less than the value 0 and not greater than the value 1, based on the braking torque demand Trb* and the vehicle distance control execution flag Fc (step S240c), sets the target reflection rate Rc* according to Equation (1) given above like the processing of step S230 (step S280c) and terminates this routine. With respect to the basic reflection rate Rctmp, the procedure of this modification specifies a relationship between the braking torque demand Trb* and the vehicle distance control execution flag Fc and the basic reflection rate Rctmp and stores the specified relationship as a basic reflection rate setting map in advance in the non-illustrated ROM. When the braking torque demand Trb* and the vehicle distance control execution flag Fc are given, the procedure of this modification reads the basic reflection rate Rctmp corresponding to the given braking torque demand Trb* and the given vehicle distance control execution flag Fc from the stored map and sets the basic reflection rate Rctmp. One example of the basic reflection rate setting map according to this modification is shown in FIG. 9. With reference to FIG. 9, in the case that the vehicle distance control execution flag Fc is the value 0, the basic reflection rate Rctmp is set to decrease from the value 1 toward the value 0 with a decrease in braking torque demand Trb* (with an increase as the absolute value) in the range where the braking torque demand Trb* is not greater than the value 0 and is greater than (is smaller as the absolute value than) the specified negative value Trb1, and is set to the value 0 in the range where the braking torque demand Trb* is not greater than the specified value Trb1, like FIG. 5. With reference to FIG. 9, in the case that the vehicle distance control execution flag Fc is the value 1, the basic reflection rate Rctmp is set to decrease from the value 1 toward the value 0 with a decrease in braking torque demand Trb* with tendency to be the larger setting than the setting in the case that the vehicle distance control execution flag Fc is the value 0 in a range where the braking torque demand Trb* is not greater than the value 0 and is greater than a predefined negative value Trb2 (Trb2<Trb1<0), and is set to the value 0 in a range where the braking torque demand Trb* is not greater than the predefined value Trb2, as in the case that the vehicle distance control execution flag Fc is the value 0. Setting the target reflection rate Rc* in this manner reduces a decrease of the target creep torque Tc* in the state of activation of the vehicle distance control, compared with in the state of non-activation of the vehicle distance control, in the case where the basic creep torque Tctmp is a positive value like the above embodiment, and accordingly has the similar advantageous effects to those of the above embodiment.

The target reflection rate setting routine of FIG. 8 omits the processing of steps S250 to S270 in the target reflection rate setting routine of FIG. 4, but may alternatively include the processing of steps S250 to S270.

In the electric vehicle 20 of the embodiment, the target reflection rate Rc* is set by the rating process with respect to the basic reflection rate Rctmp or the guarded reflection rate Rcgd. According to a modification, the target reflection rate Rc* may be set by some gradual changing process (for example, smoothing process) with respect to the basic reflection rate Rctmp or the guarded reflection rate Rcgd. According to another modification, the basic reflection rate Rctmp or the guarded reflection rate Rcgd may be set directly to the target reflection rate Rc*.

In the electric vehicle 20 of the embodiment, the target reflection rate Rc* is set by the rating process with respect to the basic reflection rate Rctmp or the guarded reflection rate Rcgd. According to a modification, the control procedure may set a gradient guarded reflection rate Rcgd2 by guarding the lower limit of the basic reflection rate Rctmp or the guarded reflection rate Rcgd with a lower limit value Rc2 according to the road surface gradient and may set the target reflection rate Rc* by the rating process of this gradient guarded reflection rate Tcgd2. The lower limit value Rc2 is determined to suppress the vehicle from sliding down, for example, at a start on an ascending slope and is set to increase with an increase of the road surface gradient as the ascending slope. Using this lower limit value Rc2 suppresses the vehicle from sliding down, for example, at a start.

In the electric vehicle 20 of the embodiment, when the vehicle is decelerated to stop in the state of activation of the vehicle distance control, the control procedure shuts down the output of creep torque, while keeping the vehicle at stop by the brake unit 40. One modification may omit the process of shutting down the output of creep torque.

In the electric vehicle 20 of the embodiment, in the accelerator-off or its equivalent state, irrespective of whether the vehicle receives a braking demand, the basic creep torque Tctmp is set to a positive value (creep torque is output from the motor 32 in the state that the target reflection rate Rc* is a positive value) when the vehicle speed V is lower than the specified vehicle speed V1. According to a modification, in the case where the vehicle receives a braking demand, the basic creep torque Tctmp may be set to a positive value when the vehicle speed V is lower than a predefined vehicle speed V3 which is slightly lower than the specified vehicle speed V1.

Figure 10:
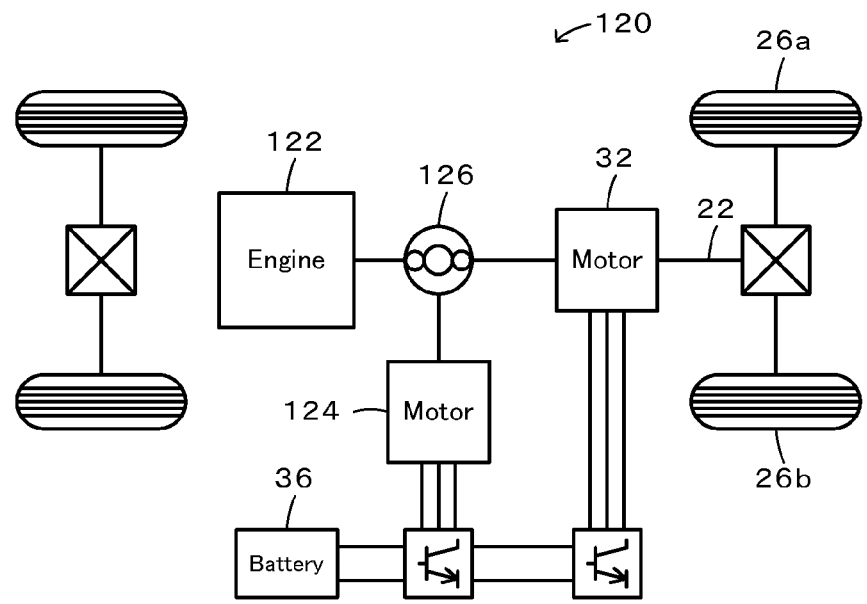
FIG. 10 is a configuration diagram illustrating the general configuration of a hybrid vehicle according to one modification.
Figure 11:
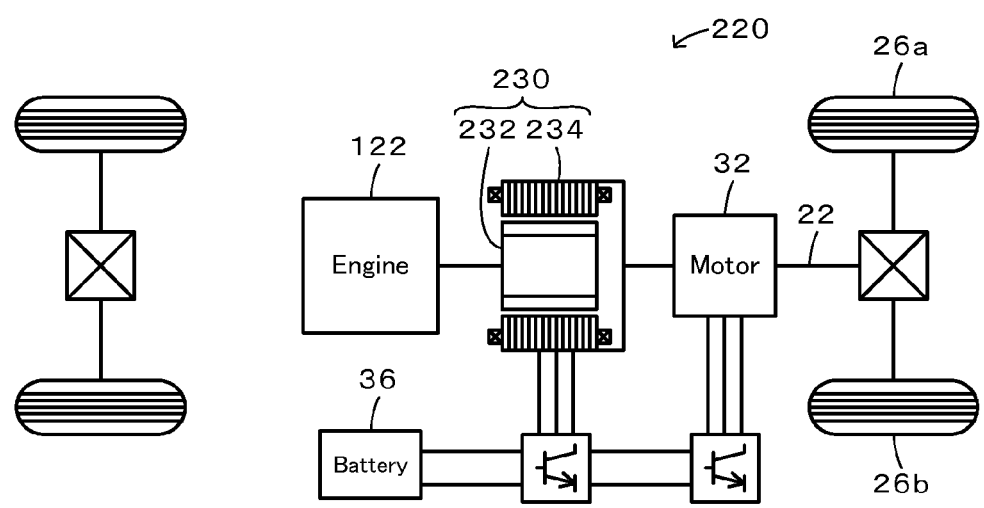
FIG. 11 is a configuration diagram illustrating the general configuration of another hybrid vehicle according to another modification.
Figure 12:
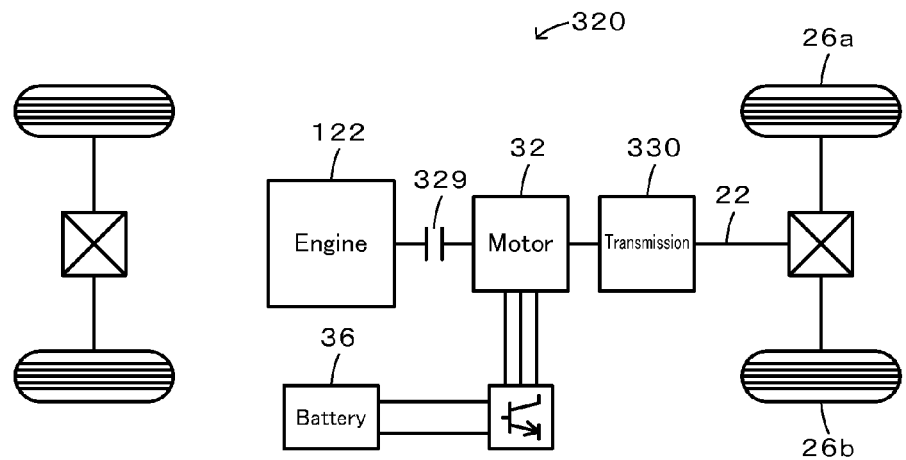
FIG. 12 is a configuration diagram illustrating the general configuration of another hybrid vehicle according to yet another modification.
Figure 13:
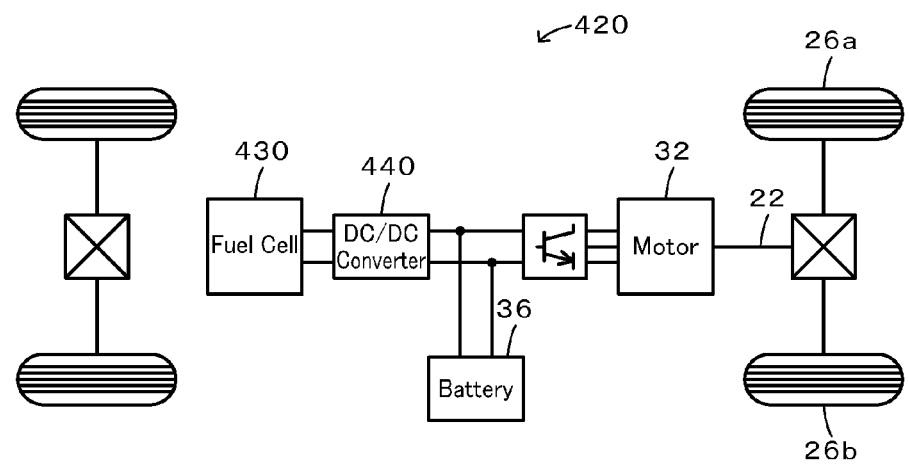
FIG. 13 is a configuration diagram illustrating the general configuration of a fuel cell vehicle according to another modification.

The embodiment describes application of the invention to the electric vehicle 20 having the motor 32 configured to input and output power to and from the driveshaft 22 connected with the drive wheels 26a and 26b and the battery 36 configured to transmit electric power to and from the motor 32. For example, as illustrated by a hybrid vehicle 120 of FIG. 10 according to one modification, the invention may also be applied to the hybrid vehicle 120 having an engine 122 and a motor 124 connected with the driveshaft 22 via a planetary gear 126, in addition to the motor 32 and the battery 36. As illustrated by a hybrid vehicle 220 of FIG. 11 according to another modification, the invention may be applied to the hybrid vehicle 220 having an engine 122 and a pair-rotor motor 230 which includes an inner rotor 232 connected with a crankshaft of the engine 122 and an outer rotor 234 connected with the driveshaft 22 and transmits part of the power from the engine 122 to the driveshaft 22 while converting the residual part of the power into electric power, in addition to the motor 32 and the battery 36. Additionally, as illustrated by a hybrid vehicle 320 of FIG. 12 according to another modification, the invention may be applied to the hybrid vehicle 320, in which the motor 32 is mounted to the driveshaft 22 via a transmission 330 and an engine 122 is connected with a rotating shaft of the motor 32 via a clutch 329. Moreover, as illustrated by a fuel cell vehicle 420 of FIG. 13 according to another modification, the invention may be applied to the fuel cell vehicle 420 having a fuel cell 430 configured to supply the generated electric power to the motor 32 via a DC-DC converter 440, in addition to the motor 32. Any of the electric vehicle 20, the hybrid vehicles 120, 220 and 320 and the fuel cell vehicle 420 may further include a charger configured to charge the battery 36 with electric power from an external power source.

The primary components of the embodiment have the following correspondence relationship to the primary components of the invention described in SUMMARY OF THE INVENTION. The motor 32 of the embodiment corresponds to the "motor"; the brake unit 40 corresponds to the "braking force applying device"; and the main ECU 50 corresponds to the "controller".

The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

There may be many other modifications, changes, and alterations without departing from the scope or spirit of the main characteristics of the present invention.

The invention is applicable to, for example, the manufacturing industries of motor vehicles.

The disclosure of Japanese Patent Application No. 2014-59977 filed on Mar. 24, 2014 including specification, drawings and claims is incorporated herein by reference in its entirety.

What is claimed is:

1. A motor vehicle, comprising:
a motor configured to input and output power for running the motor vehicle;
a braking force applying device configured to apply braking force to the motor vehicle; and
a controller configured to perform vehicle distance control of controlling the motor and the braking force applying device to run and stop the motor vehicle with adjusting a following distance from a preceding vehicle,
wherein during a run-creep and braking request time when an output demand for a creep torque and a braking demand are given during running of the motor vehicle, the controller controls the motor such as to reduce a decrease of the creep torque in a state of activation of the vehicle distance control compared with in a state of non-activation of the vehicle distance control, while controlling the braking force applying device to apply a braking force corresponding to the braking demand to the motor vehicle.

2. The motor vehicle according to claim 1,
wherein during the run-creep and braking request time in the state of activation of the vehicle distance control, the controller controls the motor and the braking force applying device to output the creep torque, irrespective of magnitude of a braking demand by the vehicle distance control.

3. The motor vehicle according to claim 2,
wherein during the run-creep and braking request time in the state of activation of the vehicle distance control, the controller controls the motor and the braking force applying device to prevent the creep torque from decreasing, irrespective of the magnitude of the braking demand by the vehicle distance control.

4. The motor vehicle according to claim 1,
wherein during the run-creep and braking request time, the controller sets a greater threshold value of the braking demand to shut down output of the creep torque in the state of activation of the vehicle distance control than a threshold value in the state of non-activation of the vehicle distance control.

5. The motor vehicle according to claim 1,
wherein when an output demand for the creep torque is given, the controller multiplies a basic creep torque by a target reflection rate to set a target creep torque and controls the motor using the set target creep torque, and
during the run-creep and braking request time, the controller sets the target reflection rate with tendency to be a larger value in the state of activation of the vehicle distance control than a value in the state of non-activation of the vehicle distance control.

6. The motor vehicle according to claim 5,
wherein at a vehicle distance control-travel creep request time when an output demand for the creep torque is given in the state of activation of the vehicle distance control, the controller prevents the target reflection rate from decreasing, irrespective of whether a braking demand is given by the vehicle distance control.

7. The motor vehicle according to claim 6,
wherein at the vehicle distance control-travel creep request time, the controller sets the target reflection rate by guarding the basic reflection rate with a previous value of the target reflection rate, irrespective of whether the braking demand is given by the vehicle distance control.

8. The motor vehicle according to claim 6,
wherein when the vehicle distance control-travel creep request time comes associated with a decrease in vehicle speed in the state of activation of the vehicle distance control, the controller subsequently keeps the target reflection rate at a predetermined positive value, irrespective of whether the braking demand is given by the vehicle distance control.

9. The motor vehicle according to claim 5,
wherein during the run-creep and braking request time, the controller sets a threshold value of the braking demand, which makes the target reflection rate equal to a value 0, in the state of activation of the vehicle distance control than a threshold value in the state of non-activation of the vehicle distance control.

10. The motor vehicle according to claim 1,
wherein the controller controls the motor and the braking force applying device such as not to output the creep torque when the motor vehicle stops in the state of activation of the vehicle distance control.

* * * * *